(12) United States Patent
Huotari et al.

(10) Patent No.: US 9,871,872 B2
(45) Date of Patent: Jan. 16, 2018

(54) MECHANISM FOR EXECUTING SERVER DISCOVERY

(75) Inventors: Seppo Huotari, Espoo (FI); Kirsi M. Rotsten, Nurmijarvi (FI)

(73) Assignee: Nokia Technologies Oy, Espoo (FI)

( * ) Notice: Subject to any disclaimer, the term of this patent is extended or adjusted under 35 U.S.C. 154(b) by 1364 days.

(21) Appl. No.: 11/785,030

(22) Filed: Apr. 13, 2007

(65) Prior Publication Data

US 2008/0256251 A1    Oct. 16, 2008

(51) Int. Cl.
| | | |
|---|---|---|
| *G06F 15/177* | (2006.01) | |
| *H04L 29/08* | (2006.01) | |
| *H04L 29/12* | (2006.01) | |

(52) U.S. Cl.
CPC .......... *H04L 67/16* (2013.01); *H04L 67/1002* (2013.01); *H04L 67/1023* (2013.01); *H04L 67/1025* (2013.01); *H04L 67/28* (2013.01); *H04L 61/2015* (2013.01)

(58) Field of Classification Search
CPC ............. H04L 61/2015; H04L 41/5058; H04L 29/12226
USPC .................................................. 709/250, 228
See application file for complete search history.

(56) References Cited

U.S. PATENT DOCUMENTS

| | | | | |
|---|---|---|---|---|
| 7,003,575 | B2 * | 2/2006 | Ikonen ......................... | 709/228 |
| 7,568,199 | B2 * | 7/2009 | Bozak et al. ................. | 718/104 |
| 7,774,438 | B2 * | 8/2010 | Zilbershtein et al. ........ | 709/220 |
| 8,064,384 | B2 * | 11/2011 | Chen et al. ................... | 370/328 |
| 8,180,382 | B1 * | 5/2012 | Graefen ........................ | 455/466 |
| 2003/0078998 | A1 * | 4/2003 | Lacome D'Estalenx ..... | 709/220 |
| 2004/0162892 | A1 | 8/2004 | Hsu | |
| 2004/0255302 | A1 | 12/2004 | Trossen | |
| 2005/0159156 | A1 * | 7/2005 | Bajko et al. ................ | 455/435.1 |
| 2005/0267972 | A1 | 12/2005 | Costa-Requena et al. | |
| 2005/0271034 | A1 * | 12/2005 | Asokan et al. ............... | 370/349 |
| 2005/0283832 | A1 * | 12/2005 | Pragada et al. ................. | 726/12 |
| 2006/0085549 | A1 * | 4/2006 | Hasti et al. ................... | 709/227 |

(Continued)

FOREIGN PATENT DOCUMENTS

| | | |
|---|---|---|
| JP | 2004364278 | 12/2004 |
| JP | 2006287416 | 10/2006 |

(Continued)

OTHER PUBLICATIONS

"3GPP TR 23.981 v5.0.0" pp. 1-34. Pub. Date: Sep. 2004.*

(Continued)

*Primary Examiner* — Oscar Louie
*Assistant Examiner* — James Forman
(74) *Attorney, Agent, or Firm* — Alston & Bird LLP

(57) ABSTRACT

A mechanism to ensure that the same server/proxy is selected by different server/proxy discovery mechanisms executed in a network control element and a terminal equipment, respectively. A first selection of a server/proxy is executed by a network control element on the basis of a first discovery procedure. Then, a second selection of a server/proxy is started by a terminal equipment on the basis of a second discovery procedure. A relay agent element is used for responding to the request on behalf of a configuration server or for modifying a configuration server response so that the same server/proxy is selected by the network control element and the terminal equipment.

33 Claims, 10 Drawing Sheets

(56) References Cited

U.S. PATENT DOCUMENTS

| | | | |
|---|---|---|---|
| 2006/0120297 A1* | 6/2006 | Hamedi | H04L 41/12 370/252 |
| 2006/0174009 A1* | 8/2006 | Martiquet et al. | 709/227 |
| 2007/0027961 A1* | 2/2007 | Holzer | 709/219 |
| 2007/0066286 A1* | 3/2007 | Hurtta | 455/414.1 |
| 2007/0165630 A1* | 7/2007 | Rasanen et al. | 370/389 |
| 2007/0208853 A1* | 9/2007 | Yang | 709/225 |
| 2007/0223450 A1* | 9/2007 | Holmstrom et al. | 370/352 |
| 2007/0232301 A1* | 10/2007 | Kueh | 455/433 |
| 2008/0092224 A1* | 4/2008 | Coulas et al. | 726/12 |
| 2009/0019106 A1* | 1/2009 | Loupia | 709/203 |
| 2009/0034536 A1* | 2/2009 | Morand et al. | 370/400 |

FOREIGN PATENT DOCUMENTS

| | | |
|---|---|---|
| JP | 2007529137 | 10/2007 |
| WO | WO 01/20846 A2 | 3/2001 |
| WO | WO 02/32178 A1 | 4/2002 |
| WO | WO-2005/064958 | 7/2005 |

OTHER PUBLICATIONS

3GPP; TS 34.229-1 v5.1.0; 3rd Generation Partnership Project; Technical Specification Group Radio Access Network; Internet Protocol (IP) Multimedia Call Control Protocol based on Session Initiation Protocol (SIP) and Session Description Protocol (SDP); User Equipment UE) Conformance Specification; Part 1: Protocol Conformance Specification (Release 5); Oct. 2006; pp. 1-155.

3GPP; TS 24.008 v7.7.0; 3rd Generation Partnership Project; Technical Specification Group Core Network and Terminals; Mobile Radio Interference Layer 3 Specification; Core Network Protocols; Stage 3 (Release 7); Mar. 2007; pp. 1-546.

3GPP; TR 23.867 v7.1.0; 3rd Generation Partnership Project; Technical Specification Group Services and System Aspects; Internet Protocol (IP) based IP Multimedia Subsystem (IMS) Emergency Sessions (Release 7); Dec. 2005; pp. 1-81.

3GPP; TS 23.167 v7.4.0; 3rd Generation Partnership Project; Technical Specification Group Services and System Aspects; IP Multimedia Subsystem (IMS) Emergency Sessions (Release 7); Mar. 2007; pp. 1-36.

3GPP; TS 23.125 v6.8.0; 3rd Generation Partnership Project; Technical Specification Group Services and System Aspects; Overall High Level Functionality and Architecture Impacts of Flow Based Charging; Stage 2 (Release 6); Mar. 2006; pp. 1-49.

3GPP; TS 23.203 v7.2.0; 3rd Generation Partnership Project; Technical Specification Group Services and System Aspects; Policy and Charging Control Architecture (Release 7); Mar. 2007; pp. 1-.

3GPP; TS 24.228 v5.15.0; 3rd Generation Partnership Project; Technical Specification Group Core Network and Terminals; Signalling Flows for the IP Multimedia Call Control Based on Session Initiation Protocol (SIP) and Session Description Protocol (SDP); Stage 3 (Release 5); Sep. 2006; pp. 1-851.

3GPP; TS 24.229 v7.7.0; 3rd Generation Partnership Project; Technical Specification Group Core Network and Terminals; IP Multimedia Call Control Protocol Based on Session Initiation Protocol and Session Description Protocol (SDP); Stage 3 (Release 7); Mar. 2007; pp. 1-409.

Vodafone; "Vodafone Gx+ Interface Specification Version: 1.3.1"; 2005; pp. 1-126.

J. Rosenberg; RFC 3261; "SIP: Session Initiation Protocol"; Jun. 2002; pp. 1-269.

Japanese Office Action for Application No. 2010-502472, dated Aug. 31, 2012.

"3rd Generation Partnership Project; Technical Specification Group Services and System Aspects; Interworking aspects and migration scenarios for IPv4 based IMS Implementations (Release 5)", 3GPP Standard; 3GPP TR 23.981, 3rd Generation Partnership Project (3GPP), Mobile Competence Centre; 650, Route Des Lucioles; F-06921 Sophia-Antipolis Cedex, France; No. V5.0.0, Sep. 1, 2004, pp. 1-34; XP050364308.

International Search Report from International Application No. PCT/EP2008/052282, dated Jun. 24, 2008.

Communication from European Application No. 08 717 116.1, dated Dec. 19, 2011.

Office Action for Chinese Patent Application Invention No. 200880011933.3, dated Oct. 23, 2012.

Summary of Office Action for Chinese Patent Application Invention No. 200880011933.3, dated Oct. 23, 2012.

First Office Action for Chinese Patent Application No. 200880011933, dated Apr. 25, 2012.

"3rd Generation Partnership Project; Technical Specification Group Services and System Aspects; Interworking aspects and migration scenarios for IPv4 based IMS Implementations (Release 6)", 3GPP Standard; 3GPP TR 23.981 V6.4.0; 3rd Generation Partnership Project (3GPP), Valbonne, France; dated Sep. 2005.

Notification of Reason(s) for Refusal for Japanese Patent Application No. 2010-502472, dated Jan. 10, 2012.

Office Action for Russian Application No. 9-7332 dated Jan. 20, 2011.

Office Action from corresponding Indian Office Action No. 5817/CHEN/2009 dated May 3, 2016.

\* cited by examiner

… (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), took place all over the world. Various organizations, such as the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), Cable-Labs and the like are working on standards for telecommunication network and multiple access environments.

MECHANISM FOR EXECUTING SERVER DISCOVERY

BACKGROUND OF THE INVENTION

Field of the Invention

The present invention relates to a mechanism used for discovering an application function or server used in a communication connection. In particular, the present invention is related to an improved mechanism ensuring that a network control element, such as a gateway network element, and a terminal equipment, such as a user equipment, shall contact the same server/proxy, such as a Proxy-Call State Control Function (P-CSCF) of an IP Multimedia Subsystem (IMS) network when establishing a communication connection.

For the purpose of the present invention to be described herein below, it should be noted that

- a terminal equipment or user equipment (UE) may for example be any device by means of which a user may access a communication network; this implies mobile as well as non-mobile devices and networks, independent of the technology platform on which they are based; only as an example, it is noted that communication equipments operated according to principles standardized by the $3^{rd}$ Generation Partnership Project 3GPP and known for example as UMTS terminals are suitable for being used in connection with the present invention; however, the terminal equipments or user equipments may also be of a type using functions and components specified by the Internet Engineering Task Force (IETF).
- when reference is made herein to a call or session, this exemplifies only a general example of a connection of any content; content as used in the present invention is intended to mean multimedia data of at least one of audio data (e.g. speech), video data, image data, text data, and meta data descriptive of attributes of the audio, video, image and/or text data, any combination thereof or even, alternatively or additionally, other data such as, as a further example, program code of an application program to be accessed/downloaded;
- method steps likely to be implemented as software code portions and being run using a processor at one of the entities described herein below are software code independent and can be specified using any known or future developed programming language;
- method steps and/or devices likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices or means or clients/servers can be implemented as individual devices or means, but this does not exclude that they are implemented in a distributed fashion throughout the system, as long as the functionality of the device is preserved.

Related Prior Art

In the last years, an increasing extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), took place all over the world. Various organizations, such as the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), Cable-Labs and the like are working on standards for telecommunication network and multiple access environments.

A current technology to merge the Internet with the cellular telecommunication world is the Internet Protocol (IP) Multimedia Subsystem or IMS. IMS is a standardized architecture for operators intending to provide mobile and fixed multimedia services. IMS uses a Voice over IP (VoIP) implementation based on a 3GPP standardized implementation of Session Initiation Protocol (SIP) and runs over the standard Internet Protocol (IP). Both packet-switched (PS) and circuit switched (CS) communication systems are supported.

When a communication connection or session is to be started, the communication path has to be established and various configuration processes are to be executed in order to set up the necessary network elements, but also to set up policy and charging rules for the connection.

One example for the steps effected during the communication connection establishment is shown in FIG. 6.

In FIG. 6 a simplified signalling diagram is depicted illustrating the signalling during a communication connection establishment between a terminal equipment (UE) and a network. The network comprises a control network element, such as a GPRS Gateway Service Node (GGSN) as a core network element and a server node, such as a P-CSCF of an IMS, as well as a policy control element, such as a Policy and Charging Rules Function (PCRF), a Policy Decision Function (PDF), or Resource and Admission Control Sub-system (RACS). In the example diagram of FIG. 6, the PCRF and P-CSCF are depicted to be part of the same network element (collocated). However, it is to be noted that these elements may also be separate elements. As a protocol for controlling interface it is possible to use Diameter (in a 3GPP rel. 7 use case, for example), but also other protocols can be used as known by those skilled in the art.

In step 1, the UE activates the primary PDP (Packet Data Protocol) context by sending a corresponding request to the network, i.e. to the GGSN. In step 2, the GGSN selects a Policy control element (for example, an external or collocated PCRF) to contact based on the user's identity provided, for example, by the Mobile Subscriber ISDN (MSISDN) number. Then, in step 3, the GGSN sends a CCR (Credit Control Request) initial message to the selected Policy control element. This message includes the Context-Type AVP (Attribute Value Pair) set to PRIMARY and the IP address allocated to the UE. Although no IMS sessions exist, the Policy control element authorizes, in step 4, the primary PDP context activation by sending a CCA (Credit Control Answer) initial message with Result-Code AVP set to SUCCESS. The Policy control element may set maximum QoS limit for the primary (general purpose) PDP context according to operator policy (e.g. max traffic class of interactive or background) and may send preconfigured charging rules if a preconfigured rule set for general purpose PDP context is provided in the Policy control element. In step 5, the GGSN activates the primary PDP context. A list of P-CSCFs may be returned to the UE. If the Policy control element and P-CSCF are collocated, the same discovered addresses are sent to the UE. In steps 8 and 9, the UE successfully registers to the IMS via the P-CSCF. The GGSN will send future requests to the selected Policy control element, such as the PCRF.

Basically, there are three standard P-CSCF Discovery (or selection) mechanisms known:

The P-CSCF address can be received as a result of a GPRS/PDP context based P-CSCF discovery procedure by the network control element (such as the GGSN). In this connection, it is to be noted that a Policy and Charging Enforcement Function (PCEF), which is located in the GGSN, may be served by one or more PCRF nodes. The PCEF may contact the appropriate PCRF based on the packet data network (PDN) connected to, together with a UE identity information (if available, and which may be IP-CAN (IP Connectivity Access Network) specific). It is possible that the same PCRF is contacted for a specific UE irrespective of the IP-CAN used.

The very first terminals contacts only to a pre-configured P-CSCF address received by OTA (Over The Air). This means the address or the logic name of the P-CSCF has to be configured into the UE.

The P-CSCF address can be received as a result of DHCP (Dynamic Host Configuration Protocol) inquiry (i.e. a so-called DHCP based P-CSCF discovery mechanism).

Furthermore, some proprietary solutions for server discovery are known.

However, as indicated above, there are several possible mechanisms proposed for a server (P-CSCF) selection of which only the PDP context based P-CSCF selection is working in specific network architectures. Thus, there could be a case where the UE has selected (for example due to a DHCP query) a different P-CSCF than the GGSN is contacting, or the GGSN is contacting to a Policy control element (for example PCRF) which is not connected to the P-CSCF the UE has contacted.

A corresponding example is shown in FIG. 7. FIG. 7 shows a simplified signalling diagram illustrating the signalling during a communication connection establishment between a terminal equipment (UE) and a network of a communication connection establishment, and is similar to that of FIG. 6 (it is to be noted that same steps of FIGS. 6 and 7 are denoted with same reference signs so that a corresponding description thereof is omitted).

Steps 1 to 5 of FIG. 7 are equivalent to steps 1 to 5 of FIG. 6. This means that the GGSN has activated the PDP context after communicating with the P-CSCF selected by it (i.e. PCRF/P-CSCF1; step 2). However, in case the P-CSCF discovery mechanism used by the UE is, for example, the DHCP based P-CSCF discovery mechanism, the GGSN could not know which P-CSCF is selected by the UE. This may result in a situation where the UE selects another P-CSCF (i.e. PCRF/P-CSCF2) than that selected by the GGSN, and sends a corresponding registration message (step 8) to this (second) P-CSCF2. The P-CSCF2 responds with a 200 OK SIP message to the register message (step 9) so that SIP registration is successful. However, when the UE sends an INVITE message, such as a SDP (Session Description Protocol) OFFER to the P-CSCF2 (step 10), the PCRF/P-CSCF2 will try to determine from the network uplink (UL)/downlink (DL) connections, to authorize the Quality of Service (QoS) and to determine the traffic category for media flows for the connection (step 11). Since the PCRF/P-CSCF2 is not the server initially selected and contacted by the GGSN for the UE, there will be a mismatch. Hence, the SIP session can not be successfully established which is notified to the UE in step 13 by a corresponding SDP answer.

In current network architectures, such as 3GPP networks, it is mandatory that a UE can freely decide which of the described mechanisms it will use to acquire the P-CSCF address. So, the P-CSCF discovery mechanism selection is up to terminals logic. However, this may cause a conflict since in some of current architectures the only mechanism usable for a P-CSCF discovery is the PDP context based P-CSCF discovery mechanism.

In addition, there are presently such terminals in use which supports only the OTA or only the DHCP based P-CSCF discovery, but lacks of supporting the GPRS based or PDP context based P-CSCF discovery mechanism.

Thus, there is the problem that by using the present discovery mechanisms in such a manner that the GGSN uses the GPRS/PDP context based one P-CSCF discovery mechanism and does not know the P-CSCF selected by the UE using, for example, the DHCP based P-CSCF discovery (or alternatively the address or logic name of P-CSCF has been configured into the UE), there may be selected different P-CSCFs so that a SIP session can not be established.

SUMMARY OF THE INVENTION

Thus, it is an object of the invention to provide an improved mechanism for selecting a server, such as a P-CSCF, for a communication connection. In particular, it is an object of the invention to provide a mechanism ensuring that all kind of terminal types sends a registration message (such as a SIP registration) to the very same server/proxy (like the P-CSCF) which is chosen beforehand by the network control element, such as the GGSN of the GPRS, or to server (P-CSCF) which is connected to the policy control element (e.g. PDF, PCRF, RACS) which the network control element (GGSN) has contacted earlier (depending on the network deployment).

This object is achieved by the measures defined in the attached claims.

In particular, according to one aspect of the proposed solution, there is provided, for example, a method comprising executing a first selection of a server on the basis of a first discovery procedure, receiving a request message related to a second selection of a server on the basis of a second discovery procedure, and responding to the request message by transmitting address information of the server selected in the first selection on the basis of the first discovery procedure.

According to another aspect of the proposed solution, there is provided, for example, a device comprising a selection unit configured to perform a selection of a server on the basis of a first discovery procedure, a receiving unit configured to receive a request message related to a second selection of a server on the basis of a second discovery procedure, a processor configured to process the request message and to respond to the request message by transmitting address information of the server selected in the first selection on the basis of the first discovery procedure.

According to another aspect of the proposed solution, there is provided, for example, a computer program product for a computer, comprising software code portions for making, when said product is run on the computer, said computer to function as a control network element for a communication connection of a terminal equipment via a network, wherein the computer program product is configured to execute a first selection of a server on the basis of a first discovery procedure, receive a request message related to a second selection of a server on the basis of a second discovery procedure, process the request message and respond to the request message by transmitting address information of the server selected in the first selection on the basis of the first discovery procedure.

According to further refinements, the proposed solution may comprise one or more of the following features:
- the first selection may be executed by a gateway network element, and the second selection may be executed by a terminal equipment;
- the executing, the receiving and the responding may be executed by a relay agent element;
- the first discovery procedure may be a packet data protocol context based discovery mechanism;
- the second discovery procedure may be a dynamic host configuration protocol based discovery mechanism;
- the server to be selected may comprise at least one of an application function server and a proxy server; then the application function server may comprises a Proxy Call State Control Function;
- the relay agent element may be comprised in the gateway network element;
- at least one policy control element may be provided; furthermore, only one policy control element may be allocated to the server;
- alternatively, a plurality of policy control elements may be provided to the server, wherein then a predetermined load balancing mechanism for selecting a same one of the plurality of policy control elements may be executed; the predetermined load balancing mechanism may be executed in a server and in a network gateway element.

According to another aspect of the proposed solution, there is provided, for example, a method comprising executing a first selection of a server on the basis of a first discovery procedure, receiving a request message related to a second selection of a server on the basis of a second discovery procedure, forwarding information included in the request message to a configuration server connected to the communication network, receiving in response from the configuration server address information, processing received address information on the basis of the first discovery procedure, and responding to the request message by transmitting address information derived from the processing of the received address information.

According to another aspect of the proposed solution, there is provided, for example, a device comprising a selection unit configured to perform a selection of a server on the basis of a first discovery procedure, a receiving unit configured to receive a request message related to a second selection of a server on the basis of a second discovery procedure, forwarding unit configured to forward information included in the request message to a configuration server connected to the communication network, a processor configured to process address information received in response from the configuration server on the basis of the first discovery procedure, and to respond to the request message by transmitting address information derived from the processing of the received address information.

According to another aspect of the proposed solution, there is provided, for example, a computer program product for a computer, comprising software code portions for making, when said product is run on the computer, said computer to function as a control network element for a communication connection of a terminal equipment via a network, wherein the computer program product is configured to execute a first selection of a server on the basis of a first discovery procedure, receive a request message related to a second selection of a server on the basis of a second discovery procedure, forward information included in the request message from the relay agent element to a configuration server connected to the communication network, receive in response from the configuration server address information, process the received address information on the basis of the first discovery procedure, and respond to the request message by transmitting address information derived from the processing of the received address information.

According to further refinements, the proposed solution may comprise one or more of the following features:
- the executing, the receiving, the forwarding, the processing and the responding may be executed by a relay agent element;
- the first discovery procedure may be a packet data protocol context based discovery mechanism;
- the second discovery procedure may be a dynamic host configuration protocol based discovery mechanism;
- the server to be selected may comprise a Proxy Call State Control Function;
- the relay agent element may be comprised in the gateway network element;
- at least one policy control element may be provided;
- a predetermined load balancing mechanism may be executed in a server and in a network gateway element.

According to another aspect of the proposed solution, there is provided, for example, a device comprising selection means for performing a selection of a server on the basis of a first discovery procedure, receiving means for receiving a request message related to a second selection of a server on the basis of a second discovery procedure, processing means for processing the request message and responding means for responding to the request message by transmitting address information of the server selected in the first selection on the basis of the first discovery procedure.

According to another aspect of the proposed solution, there is provided, for example, a system comprising at least a first and a second server, a network control element executing a first selection of the first server on the basis of a first discovery procedure, a terminal equipment executing a second selection of the second server on the basis of a second discovery procedure, wherein the second server is configured to receive a request message from the terminal equipment, to determine the first server selected by the network control element, to forward a service request message to the first server on the basis of the request message received from the terminal equipment.

By virtue of the proposed solutions, it is possible to ensure that a connection, such as a SIP session, from a terminal or UE, which does not support a predetermined server discovery mechanism but uses another discovery mechanism than that used by the network control element, is properly established, irrespective of which type the terminal is or which access type is selected. In other words, it can be avoided that a session or the like is rejected due to a mismatch of servers (P-CSCFs) selected by the UE and the network control element, respectively.

The above and still further objects, features and advantages of the invention will become more apparent upon referring to the description and the accompanying drawings.

DESCRIPTION OF PREFERRED EMBODIMENTS

Figure 1:
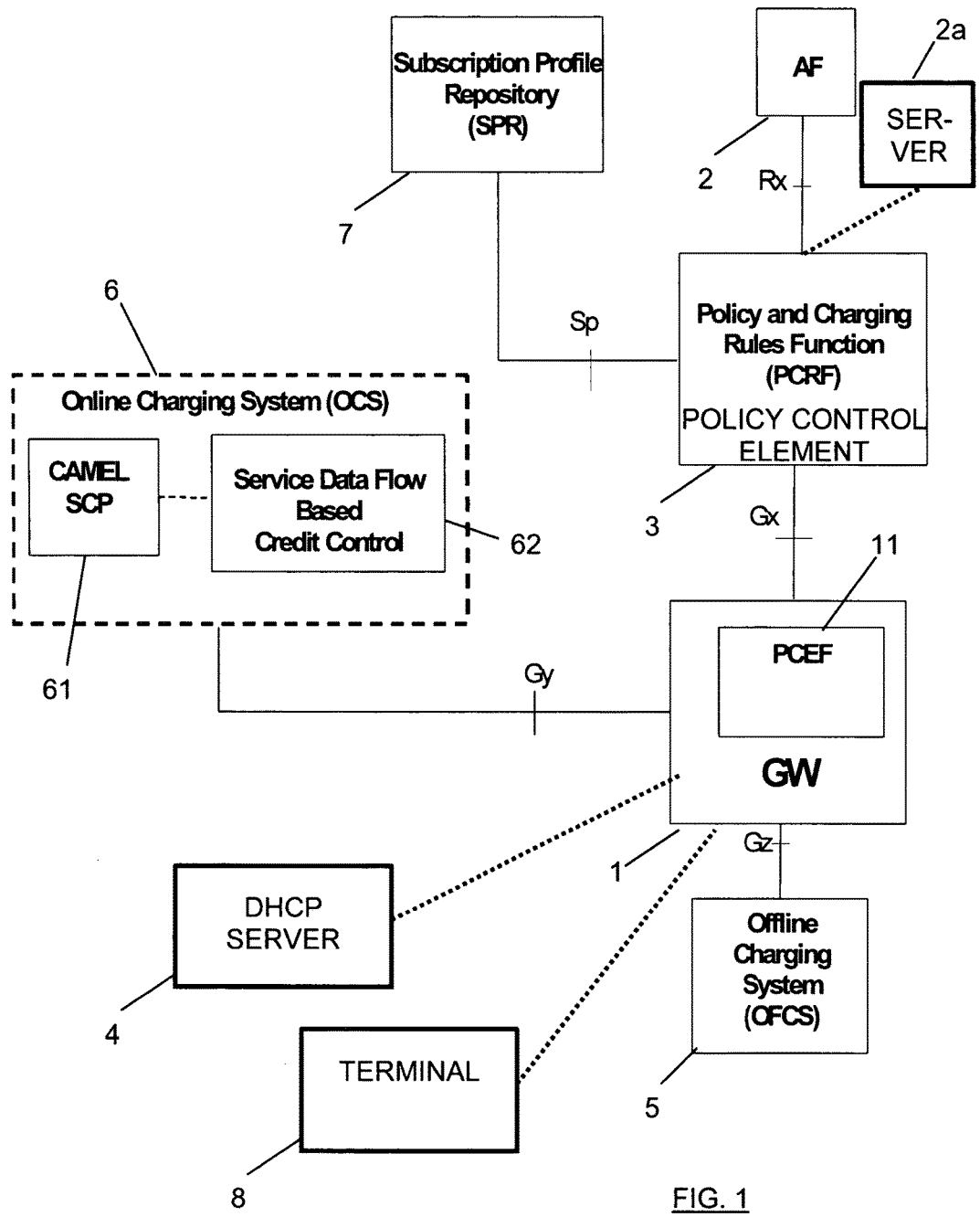
FIG. 1 shows a diagram illustrating a simplified network structure including a policy and charging control architecture where the present invention is applicable.

In the following, examples and embodiments of the present invention are described with reference to the drawings. For illustrating the present invention, the examples and embodiments will be described in connection with a 3GPP system where a session to an application function (AF) of an IMS network, i.e. a multimedia communication connection or session of a terminal located in this IMS network, is to be established. However, it is to be noted that the present invention is not limited to an application in such a system or environment but is also applicable in other network systems, connection types and the like, for example in a TISPAN policy control system.

A basic system architecture of a communication network comprising charging and session handling mechanisms may comprise a commonly known architecture of an IMS network. Such a network architecture comprises several control nodes or CSCF which are SIP servers or proxies fulfilling several roles (such as Interrogating CSCF (I-CSCF), Proxy CSCF (P-CSCF), Serving CSCF (S-SCSF)) and used to process SIP signalling packets in the IMS. Furthermore, charging functionalities like an Offline Charging System (OFCS) or an Online Charging System (OCS) are provided which are used for charging control. Moreover, network nodes like Interconnect Border Control Function (IBCF), Subscription Locator Function (SLF) and Home Subscriber Server (HSS) which are queried through interfaces from an I-CSCF are part of the complete architecture. The general functions and interconnections of these elements are known to those skilled in the art and described in corresponding specifications so that a detailed description thereof is omitted herein. However, it is to be noted that there are provided several additional network elements and signaling links used for a communication connection.

Furthermore, the network elements and their functions described herein may be implemented by software, e.g. by a computer program product for a computer, or by hardware. In any case, for executing their respective functions, correspondingly used devices or servers/clients, such as a terminal equipment, a core network control element, a CSCF, an access network subsystem element like a Base Station Subsystem BSS element or Radio Access Network RAN element and the like, comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like. This means that the respective network parts, like the IMS domain, may comprise several elements and/or functionalities not shown which are known, however, to a person skilled in the art and therefore not described in greater detail herein.

FIG. 1 shows a simplified network structure including a policy and charging control architecture where the present invention is applicable. Reference sign 1 denotes a gateway network element GW as a network control element, such as a GGSN. The GW or GGSN 1 may comprise a policy and charging enforcement function PCEF encompassing service IP flow detection, policy enforcement and IP flow based charging functionalities. Reference sign 2 denotes an application function of an IMS network, such as a P-CSCF. Reference sign 2a denotes another server (or a plurality of servers) or a proxy (or a plurality of proxies) connectable to the network. Reference sign 3 denotes a policy control element, such as a PCRF which coordinates network resources to meet the demands of users that are authorized to use requested services and encompasses policy control decision and IP flow based charging control functionalities. Even though in the following the policy control element 3 is described as a PCRF, it is to be noted that the policy control element may also be a PDF or a RACS. The PCRF 3 allows to use static charging rules and dynamic ruling in addition to rules-based charging. The dynamic ruling function is achieved through real-time interaction with the PCEF 11. The GW 1 (the PCEF 11) is connected to the PCRF 3 via a Gx interface, which is Diameter based, for example, and the AF (or P-CSCF) 2 is connected to the PCRF 3 via a Rx interface (the further server or servers 2a may be connected to the policy control element by means of corresponding interfaces as well). As mentioned above, instead of the Diameter protocol, it is also possible to employ another protocol type, dependent on the network architecture.

Reference sign 4 denotes a configuration server, such as a DHCP server usable for a DHCP based server discovery. For example, the configuration server 4 is connected to the network via a relay agent element, such as a DHCP relay agent (not shown in FIG. 1) in the gateway network element 1.

Reference sign 5 denotes an OFCS. Reference sign 6 denotes an OCS comprising, for example, a CAMEL (Customized Applications for Mobile Enhanced Logic) SCP (Service Control Point) 61 and a service data flow based credit control unit 62. The OFCS 5 is connected to the gateway 1 via a Gz interface and the OCS 6 is connected to the gateway 1 via a Gy interface.

Reference sign 7 denotes a subscription profile repository (SPR) containing all subscriber and subscription related information needed for subscription-based policies and access level policy and charging rules by the policy control element (here the PCRF), which is connected to the PCRF via a Sp interface.

Reference sign 8 denotes a terminal or user equipment (UE) for which a communication connection or session is to be established with the network via the network control element (the GGSN) 1. The connection of the terminal 8 to the network is done by means of corresponding interfaces and subsystems (e.g. access network subsystem) which is commonly known.

In the system of FIG. 1, the PCRF 3 and the P-CSCF 2 are shown as separate elements. However, instead of being an external network element, the PCRF 3 may be collocated in the P-CSCF 2.

Figure 2:
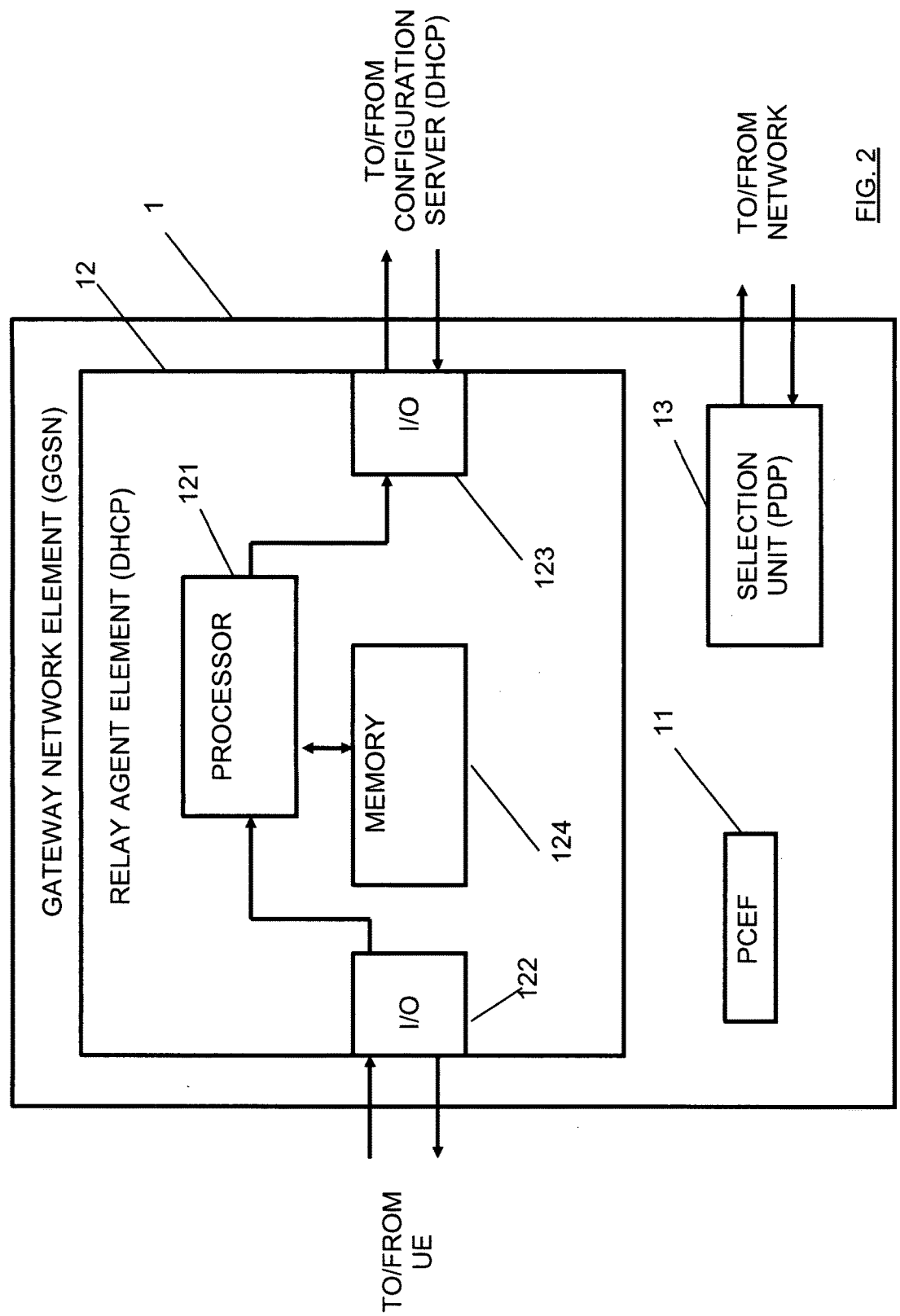
FIG. 2 shows a diagram illustrating details of a network element of the network structure of FIG. 1.

In FIG. 2, a more detailed diagram of the gateway network element 1 according to FIG. 1 is shown. It is to be noted that the same reference signs are used for equivalent elements so that a further description thereof is omitted here.

Reference sign 12 denotes a relay agent element which is usable in a discovery mechanism executed between the terminal and the network, for example, in connection with a DHCP based P-CSCF discovery mechanism. The relay agent element 12 comprises a processor 121 for executing and controlling a processing in the respective discovery mechanism.

Reference sign 122 denotes an interface or input/output element (I/O) for communicating between the relay agent element 12 (i.e. the processor 121) and the UE. This means that via the I/O 122 data, such as request and answer messages, are transferred between the relay agent element 12 and the UE.

Reference sign 123 denotes an interface or input/output element (I/O) for communicating between the relay agent element 12 (i.e. the processor 121) and a configuration server used for obtaining address information in the discovery mechanism, such as a DHCP server. This means that via the I/O 123 data, such as request and answer messages, are transferred between the relay agent element 12 and the configuration server. In particular, request message information from the UE may be forwarded via this I/O 123.

Reference sign 124 denotes a memory for storing therein data, such as computer program product executed by the processor 121, buffering address information received from another element for forwarding it, and serving as a working space for the processor 121.

Figure 6:
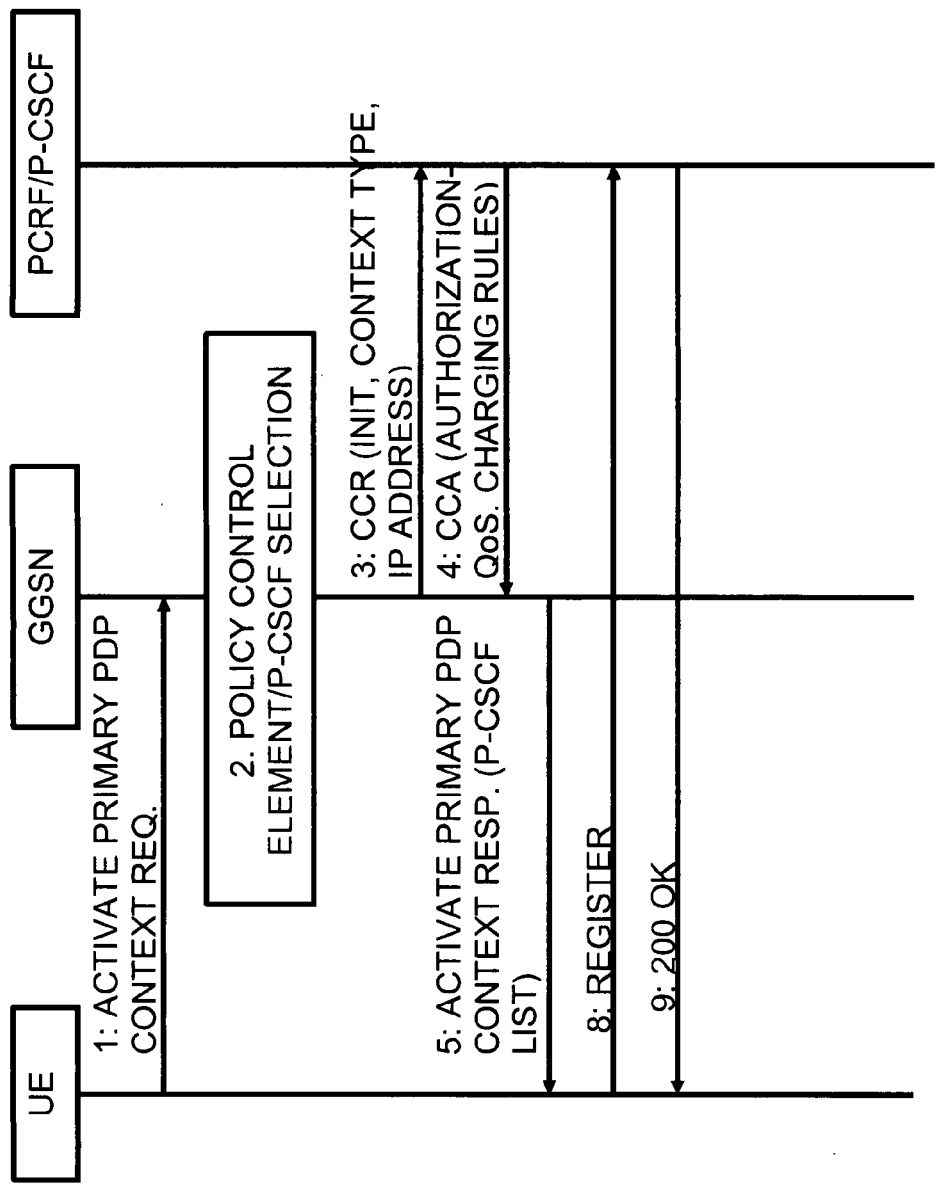
FIG. 6 shows a signalling diagram illustrating a P-CSCF selection according to the prior art.
Figure 7:
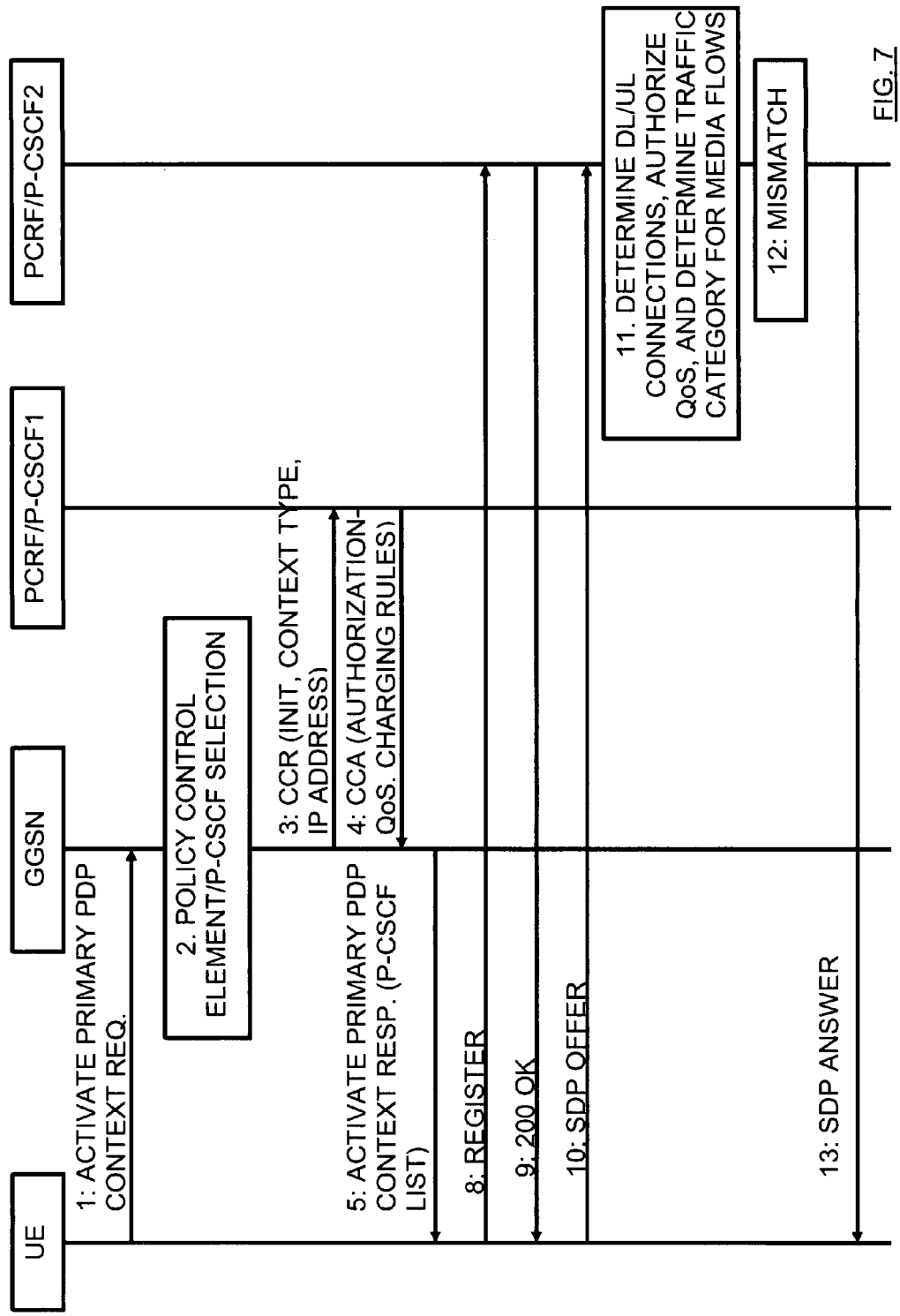
FIG. 7 shows a signalling diagram illustrating a P-CSCF selection according to the prior art.

Reference sign 13 denotes a selection unit by means of which the gateway network element 1 is able to execute another type of server discovery mechanism, such as a PDP context based P-CSCF discovery mechanism. The selection unit 13 is connected to the network in order to achieve address information of servers, such as one or more P-CSCFs, and to select one of these servers for the establishment of a communication connection for the UE (corresponding to step 2 of FIG. 6, for example). The selection of one of the servers, i.e. of one P-CSCF, is based on a predetermined algorithm known to those skilled in the art.

It is to be noted that information retrieved by the selection unit 13, such as address information of one or more servers/proxies selected by the gateway network element 1 in the discovery procedure based, for example, on the PDP context, can be provided by the selection unit 13 to the relay agent element 12 and stored therein, for example, in the memory 124 for further processing.

In a situation where the units involved in the establishment of a communication connection or session, such as the terminal equipment or UE 8 and the network control element or gateway network element (GGSN) 1, are using different discovery mechanism for selecting a server/proxy for the session, such as a P-CSCF 2, it is to be ensured that the same server/proxy is selected by the these units so that the session establishment is successful. For example, a situation may be assumed where the GGSN 1 uses a PDP based P-CSCF discovery mechanism and the UE uses a DHCP based P-CSCF discovery mechanism.

According to a first example of the present invention, in order to ensure that all kinds of terminals (which do not use a first kind of discovery mechanism but another (a second) type) send a registration message (e.g. a SIP registration) to the same server/proxy (i.e. P-CSCF), which is contacted by the gateway network node (the GGSN) as a result of a P-CSCF discovery based on the first discovery mechanism (e.g. the PDP context based P-CSCF discovery mechanism), or to P-CSCF which is connected to a policy control element (e.g. a PCRF) which GGSN has contacted earlier (depending on the NW deployment), or to the P-CSCF, which is pre-configured (e.g. by fixed pre-setting of a corresponding address) to work with the policy control element (PCRF) the GGSN has already sent Diameter request earlier, a relay agent element used for the second type of discovery mechanism employed by the terminal is used for transmitting corresponding address information. For example, in case the terminal is using the DHCP based P-CSCF discovery mechanism, the relay agent element is a DHCP relay agent element located in the gateway network element. The relay agent element is responding to the DHCP based proxy request sent by the terminal on behalf of the (normally responding) DHCP server when the gateway network element using the PDP context based discovery mechanism has contacted a P-CSCF for the establishment of the session.

Figure 3:
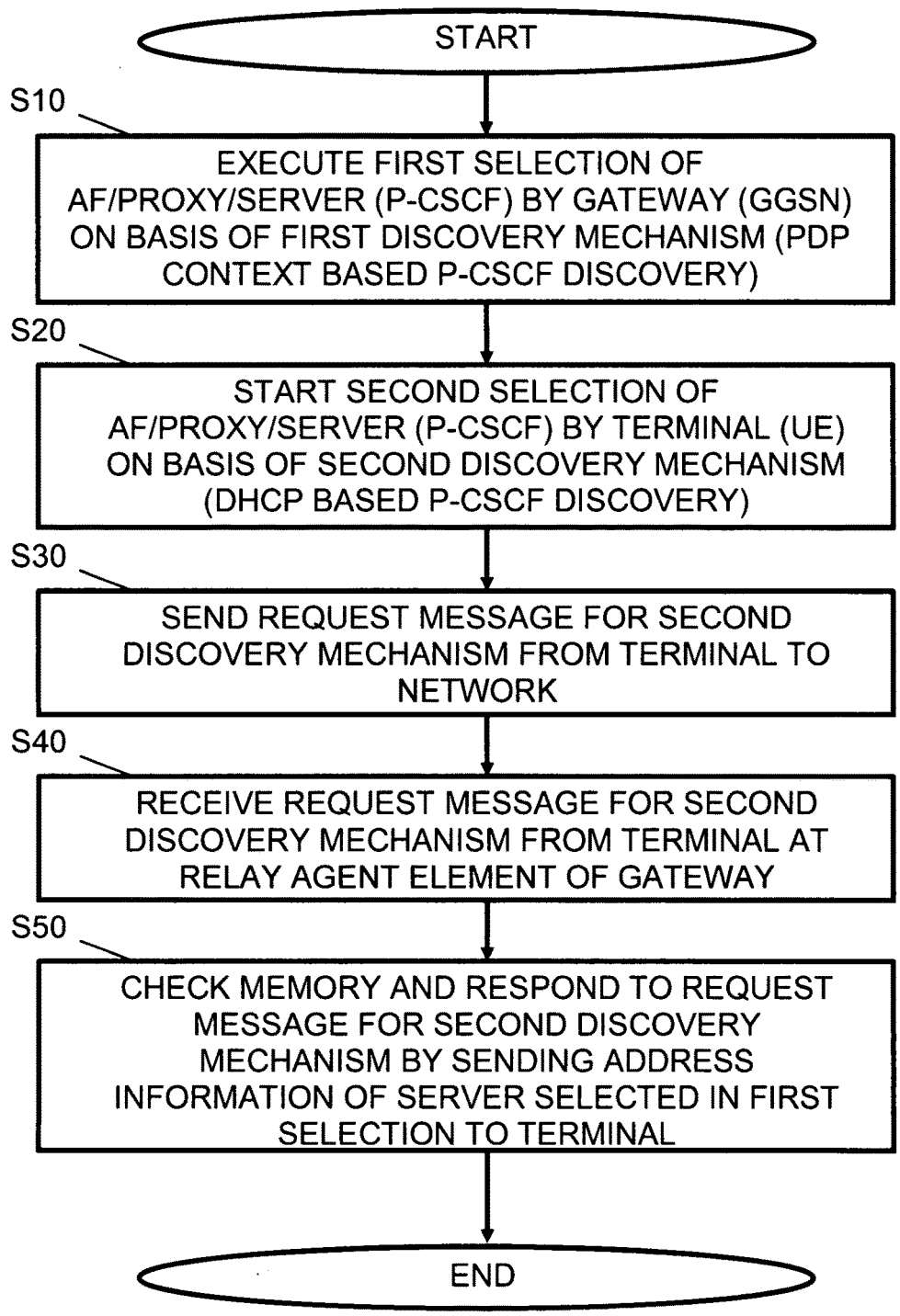
FIG. 3 shows a flow chart illustrating a server discovery method according to a first example of the present invention.

In FIG. 3, a flow chart illustrating a server/proxy selection according to this first example is described. In step S10, the gateway network element 1 executes a first discovery mechanism for selecting a proxy server, such as a PDP context based P-CSCF discovery mechanism, and selects a specific P-CSCF. The selection may be executed, for example, by the selection unit 13. The details of a PDP context based P-CSCF discovery mechanism are known to those skilled in the art and thus not described in detail here.

Then, in step S20, a selection of a proxy server based on a second type of discovery mechanism being different to that used by the gateway network element 1 is started by the terminal (UE) 8. The terminal 8 is using the DHCP based P-CSCF discovery mechanism described above. Therefore, the terminal 8 send in step S30 a request message to the network in order to contact a DHCP server for obtaining address information of candidate P-CSCFs for selection.

The request message is received in step S40 by the DHCP relay agent element 12 of the gateway network element 1. The relay agent element 12, i.e. a processor thereof, is informed by the selection unit 13, for example, that the gateway network element has already contacted a P-CSCF in the preceding discovery procedure. Furthermore, the address information of at least the selected P-CSCF is transferred from the selection unit 13 to the relay agent element 12 and stored, for example, in the memory 124.

Therefore, the relay agent element replies in step S50 to the request message of the terminal 8 on behalf of the DHCP server. The relay agent sends address information related to the P-CSCF selected by the gateway network element 1 (the selection unit 13) in the preceding PDP context based P-CSCF discovery mechanism, which may be stored in the memory 124 and retrieved therefrom. Thus, the execution of both discovery mechanisms results in the same P-CSCF selection.

On the basis of this information, it is possible that the GGSN 1 contacts to the correct policy control element (such as the PCRF (external or collocated one)). The P-CSCF has to send the very first command, such as a Diameter command if this protocol type is used, to the policy control element (the PCRF in this example). This means that there should be such a network deployment or mechanism (e.g. SLF kind of mechanism, but dynamic way to select) which ensures that these requests shall found the same policy control element (PCRF) instance the GGSN is earlier contacted to.

One possibility to ensure this is to configure the relationship between PCRFs and P-CSCFs in such a way that there is just one dedicated PCRF serving one or several P-CSCFs. However, if this is not the case, i.e. in a situation in which there can be many PCRFs serving each P-CSCFs, the GGSN is provided with a load balancing mechanism to select between PCRFs.

As a modification, it is also possible that the policy control element is provided with capabilities to enquire subscriber's dedicated/subscription's or subscriber's end device specified P-CSCF via a database. For example, the enquiry can happen via the Sp-interface from subscription profile repository (SPR) in 3GPP Rel-7 architecture or via e4 from a Network Attachment Subsystem (NASS) in TISPAN model. The e4 may be the interface between the Connectivity Session Location and Repository Function (CLF) and the RACS.

Also other standardization bodies may specify their ways of obtaining similar information. Furthermore, the P-CSCF has a similar logic (except the SP/e4 interface capabilities) in order to contact the same policy control element (such as the PCRF). Alternatively, the policy control element comprises an own mechanism to negotiate which of the contacted PCRFs (i.e. of the PCRF contacted by the P-CSCF and the P-CSCF contacted by the GGSN) serves the subscriber.

According to a further (second) example of the present invention, in order to ensure that all kinds of terminals (which do not use a first kind of discovery mechanism but another (a second type)) send a registration message (e.g. a SIP registration) to the same server/proxy (i.e. P-CSCF), which is contacted by the gateway network node (the GGSN) as a result of a P-CSCF discovery based on the first discovery mechanism (e.g. the PDP context based P-CSCF discovery mechanism), or to P-CSCF which is connected to a policy control element (e.g. a PCRF) which GGSN has contacted earlier (depending on the NW deployment), or to the P-CSCF, which is pre-configured to work with the PCRF the GGSN has already sent Diameter request earlier, a relay agent element used for the second type of discovery mechanism employed by the terminal is used for modifying corresponding address information. For example, in case the terminal is using the DHCP based P-CSCF discovery mechanism, the relay agent element is a DHCP relay agent element located in the gateway network element. The relay agent element is responding to the DHCP based proxy request sent by the terminal after modifying the DHCP server responses by using the same algorithm which the gateway network element 1 (GGSN) is using in the PDP context based P-CSCF discovery mechanism.

Figure 4:
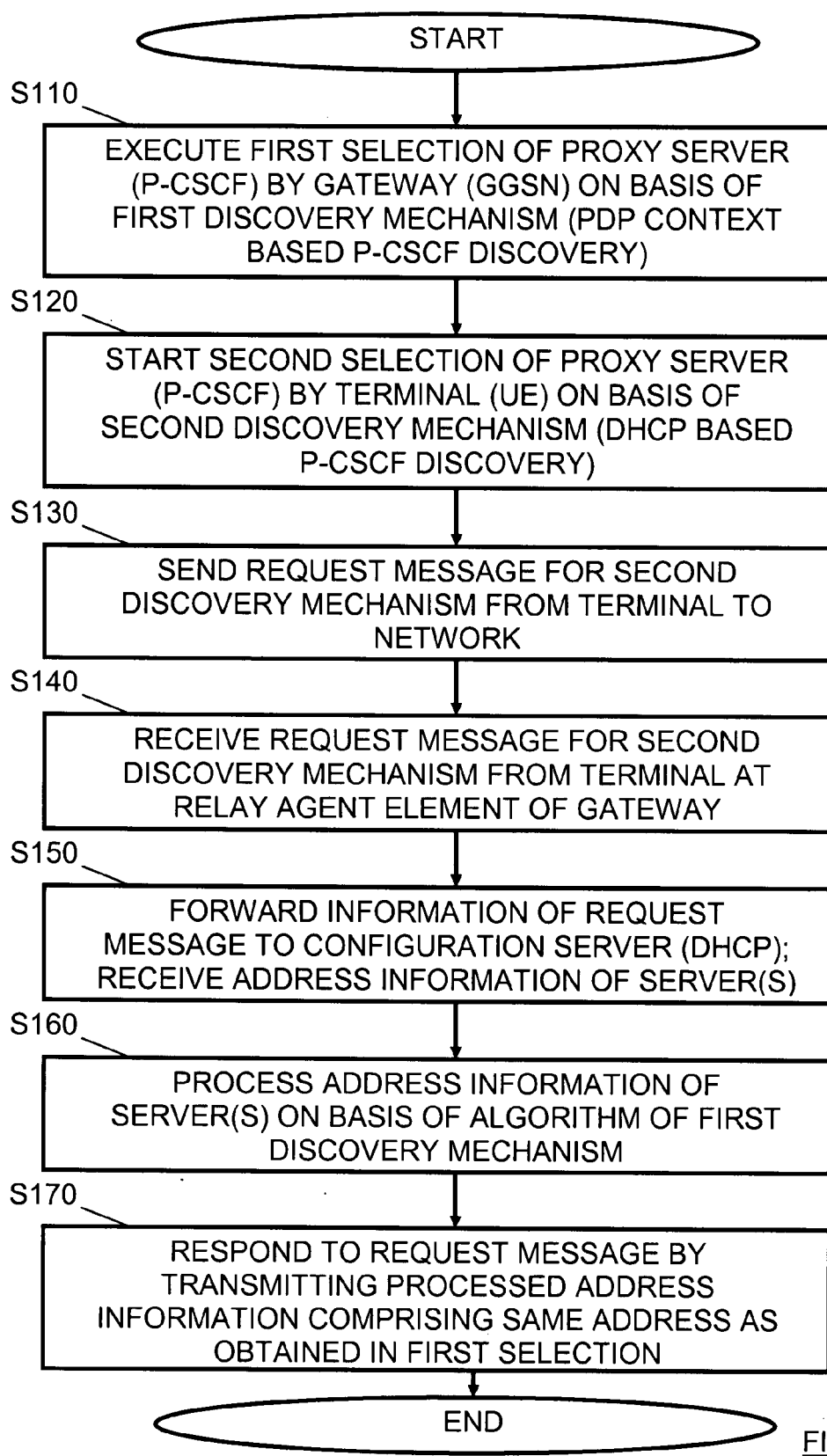
FIG. 4 shows a flow chart illustrating a server discovery method according to a second example of the present invention.

In FIG. 4, a flow chart illustrating a server/proxy selection according to this second example is described. In step S110, the gateway network element 1 executes a first discovery mechanism for selecting a proxy server, such as a PDP context based P-CSCF discovery mechanism, and selects a specific P-CSCF. The selection may be executed, for example, by the selection unit 13 on the basis of a specific algorithm. The details of a PDP context based P-CSCF discovery mechanism are known to those skilled in the art and thus not described in detail here.

Then, in step S120, a selection of a proxy server based on a second type of discovery mechanism being different to that used by the gateway network element 1 is started by the terminal (UE) 8. The terminal 8 is using the DHCP based P-CSCF discovery mechanism described above. Therefore, the terminal 8 sends in step S130 a request message to the network in order to contact a DHCP server for obtaining address information of candidate P-CSCFs for selection.

The request message is received in step S140 by the DHCP relay agent element 12 of the gateway network element 1. The information contained in this request message is forwarded in step S150 to a corresponding configuration (e.g. DHCP) server 4 in a usual manner. The configuration server 4 answers to the request by sending, for example, address information of corresponding servers/proxies (P-CSCFs) to the relay agent element 12.

In step S160, the relay agent element 12, i.e. the processor 121, processes the received address information from the DHCP server. In detail, the response of the DHCP server is modified by using the same algorithm which the GGSN (i.e. the selection unit 13) is using in the PDP context based P-CSCF discovery mechanism. Then, in step S170, the relay agent element 12 responds to the request of the terminal 8 by sending address information of corresponding P-CSCF retrieved in the modification processing. The address information comprises the same server address like that obtained in step S110, due to the usage of the same algorithm.

In other words, the DHCP relay agent element 12 acts as a server towards a client (i.e. the terminal) and as a relay towards a server (the configuration server).

Furthermore, the same algorithm which the GGSN 1 is using in the PDP context based P-CSCF discovery mechanism is to be configured to DHCP. All necessary information, such as subscriber related ID information like UE's IP address, IMSI or MSISDN, may be transferred in the interface between the gateway network element 1 and the configuration server (DHCP server).

On the basis of the received information, it is possible that the GGSN 1 contacts to the correct policy control element (such as the PCRF (external or collocated one)). The P-CSCF has to send the very first command, such as a Diameter command, to the policy control element (e.g. the PCRF). This means that there should be such a network deployment or mechanism (e.g. SLF kind of mechanism, but dynamic way to select) which ensures that these requests shall found the same policy control element instance the GGSN is earlier contacted to.

One possibility to ensure this is to configure the relationship between policy control elements, like PCRFs, and servers/proxies, like P-CSCFs, in such a way that there is just one dedicated policy control element serving one or several P-CSCFs. However, if this is not the case, i.e. in a situation in which there can be many policy control element (PCRFs) serving each P-CSCFs, the GGSN may be provided with a load balancing mechanism to select between policy control elements (PCRFs). Furthermore, the P-CSCF has a similar logic in order to contact the same policy control element (PCRF). Alternatively, the policy control element (PCRF) comprises an own negotiation mechanism to negotiate which of the contacted policy control elements (PCRFs) (i.e. of the policy control element contacted by the P-CSCF and the P-CSCF contacted by the GGSN) serves the subscriber.

Figure 5:
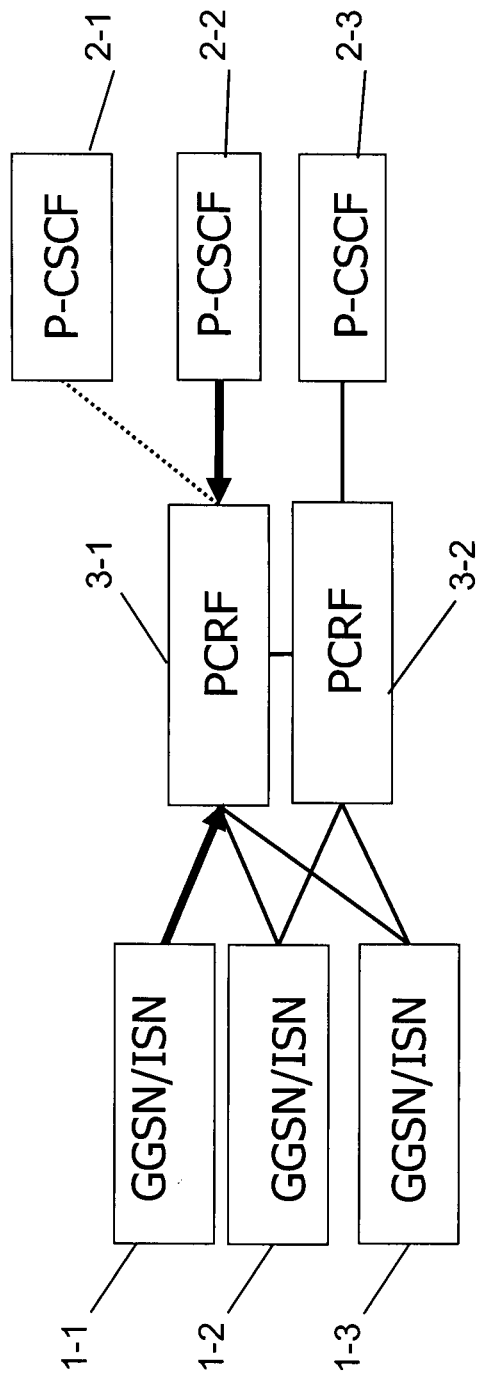
FIG. 5 shows a diagram illustrating a connection situation between network elements after a server discovery mechanism is executed.

In FIG. 5, the relationship between PCRFs and P-CSCFs as well as the connection of the P-CSCFs and GGSN to the PCRF is illustrated. Reference signs 1-1, 1-2 and 1-3 denote respective GGSN (gateway network element). Reference signs 3-1 and 3-2 denote PCRFs. Reference signs 2-1, 2-2 and 2-3 denote P-CSCFs. The PCRF 3-1 is serving to P-CSCFs 2-1 and 2-2, while the PCRF 3-2 is serving to P-CSCF 2-3. In case there would be a P-CSCF served by both PCRFs 3-1 and 3-2, the PCRFs 3-1 and 3-2 may comprise a connection in order to enable the negotiation mechanism to work. In the situation illustrated in FIG. 5, for a communication connection to be established and after a selection of server/proxies as described, for example in connection with FIG. 3 or FIG. 5, the P-CSCF 2-2 is selected and GGSN 1-1 is connected to PCRF 3-1 having a connection to the selected P-CSCF 2-2.

It is to be noted that it the PCRF IDs may be pre-configured to the GGSN 1-1 to 1-3.

In the following, alternative examples for ensuring that all kinds of terminals (which do not use a first kind of discovery mechanism but another (a second) type) send a registration message (e.g. a SIP registration) to the same server/proxy (i.e. P-CSCF), which is contacted by the gateway network node (the GGSN) as a result of a P-CSCF discovery based on the first discovery mechanism (e.g. the PDP context based P-CSCF discovery mechanism), or to P-CSCF which is connected to a policy control element (e.g. a PCRF) which GGSN has contacted earlier (depending on the NW deployment), or to the P-CSCF, which is pre-configured (e.g. by fixed pre-setting of a corresponding address) to work with the PCRF the GGSN has already sent a request, such as a Diameter request, earlier, are described.

According to a first alternative example, a primary P-CSCF has a similar logic (i.e. an algorithm in use) like the gateway network element (the GGSN) which uses the PDP context based P-CSCF selection. Therefore, when the primary P-CSCF is contacted by the terminal but has not been contacted by the gateway network element beforehand, the primary P-CSCF executes a corresponding processing on the basis of this algorithm and determines another, secondary P-CSCF (i.e. the P-CSCF selected by the GGSN). Then, the primary P-CSCF is able to redirect a register message of the terminal, such as a SIP REGISTER message, to the another (secondary) P-CSCF which has been contacted (i.e. selected) by the GGSN beforehand. Optionally, the P-CSCF can receive the MSISDN as a part of a request-URI. The P-CSCF can use the MSISDN in the algorithm to determine another (secondary) P-CSCF. It is to be noted that the re-routing is based on pre-configured information (i.e. the next P-CSCF's address).

Furthermore, the P-CSCF/PCRF is configured to authorize the SIP REGISTER messages in order to check whether the SIP REGISTER message is sent to the correct P-CSCF or whether the PCRF has received the Diameter CCR request carrying the same UE's IP address earlier. The Information of the correct P-CSCF may be available during the IMS registration period.

Figure 8:
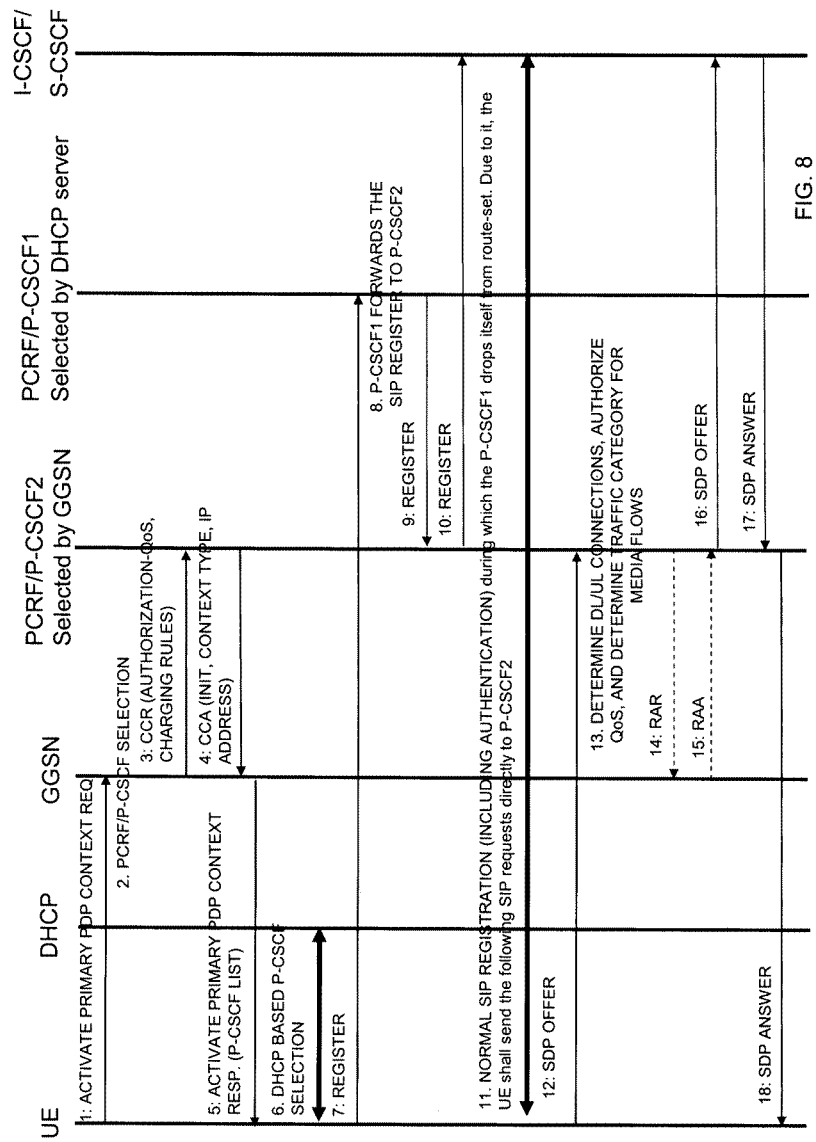
FIG. 8 shows a signalling diagram illustrating a P-CSCF selection according to a first alternative example.

A corresponding mechanism is shown in FIG. 8. Here, in a step 1, the UE activates the primary PDP (Packet Data Protocol) context by sending a corresponding request to the network, i.e. to the GGSN. In step 2, the GGSN selects a Policy control element (for example, an external or collocated PCRF) to contact based on the user's identity provided, for example, by the Mobile Subscriber ISDN (MSISDN) number. Then, in step 3, the GGSN sends a CCR (Credit Control Request) initial message to the selected Policy control element (i.e. PCRF/P-CSCF2). This message includes the Context-Type AVP (Attribute Value Pair) set to PRIMARY and the IP address allocated to the UE. Although no IMS sessions exist, the Policy control element authorizes, in step 4, the primary PDP context activation by sending a CCA (Credit Control Answer) initial message with Result-Code AVP set to SUCCESS. The Policy control element may set maximum QoS limit for the primary (general purpose) PDP context according to operator policy (e.g. max traffic class of interactive or background) and may send preconfigured charging rules if a preconfigured rule set for general purpose PDP context is provided in the Policy control element. In step 5, the GGSN activates the primary PDP context. A list of P-CSCFs may be returned to the UE. If the Policy control element and P-CSCF are collocated, the same discovered addresses are sent to the UE. This means that the GGSN has activated the PDP context after communicating with the P-CSCF selected by it (i.e. PCRF/P-CSCF1; step 2). Now, the UE uses the DHCP based P-CSCF discovery mechanism. Assuming the UE selects another P-CSCF (i.e. PCRF/P-CSCF1) than that selected by the GGSN (which is PCRF/P-CSCF2), it sends a corresponding registration message (step 7) to this (second) P-CSCF1. The P-CSCF1 having the same logic like the GGSN determines the P-CSCF2 as that selected by the GGSN and forwards the Register message to the P-CSCF2 (steps 9 and 10). Steps 11 and 12 are 200 OK messages for confirming the registration of steps 9 and 10. The normal registration procedure takes place specified e.g. in 3GPP or IETF. The only exception to the specified normal registration procedure is, that the P-CSCF1 may drop itself from the route-set (as it has no need to remain in the signalling path once the session is established).

In step 12, the UE sends an INVITE message, such as a SDP (Session Description Protocol) OFFER to the P-CSCF2, which determines in step 13, for example, uplink (UL)/downlink(DL) connections, authorizes the Quality of Service (QoS) and determines the traffic category for media flows for the connection. The P-CSCF2 may send the updated PCC rule information to the Access Network (steps 14 and 15). In step 17, a corresponding SDP answer is sent to the P-CSCF2, which sends a corresponding SDP answer to the UE (step 18). Thus, a session can be successfully established.

Figure 10:
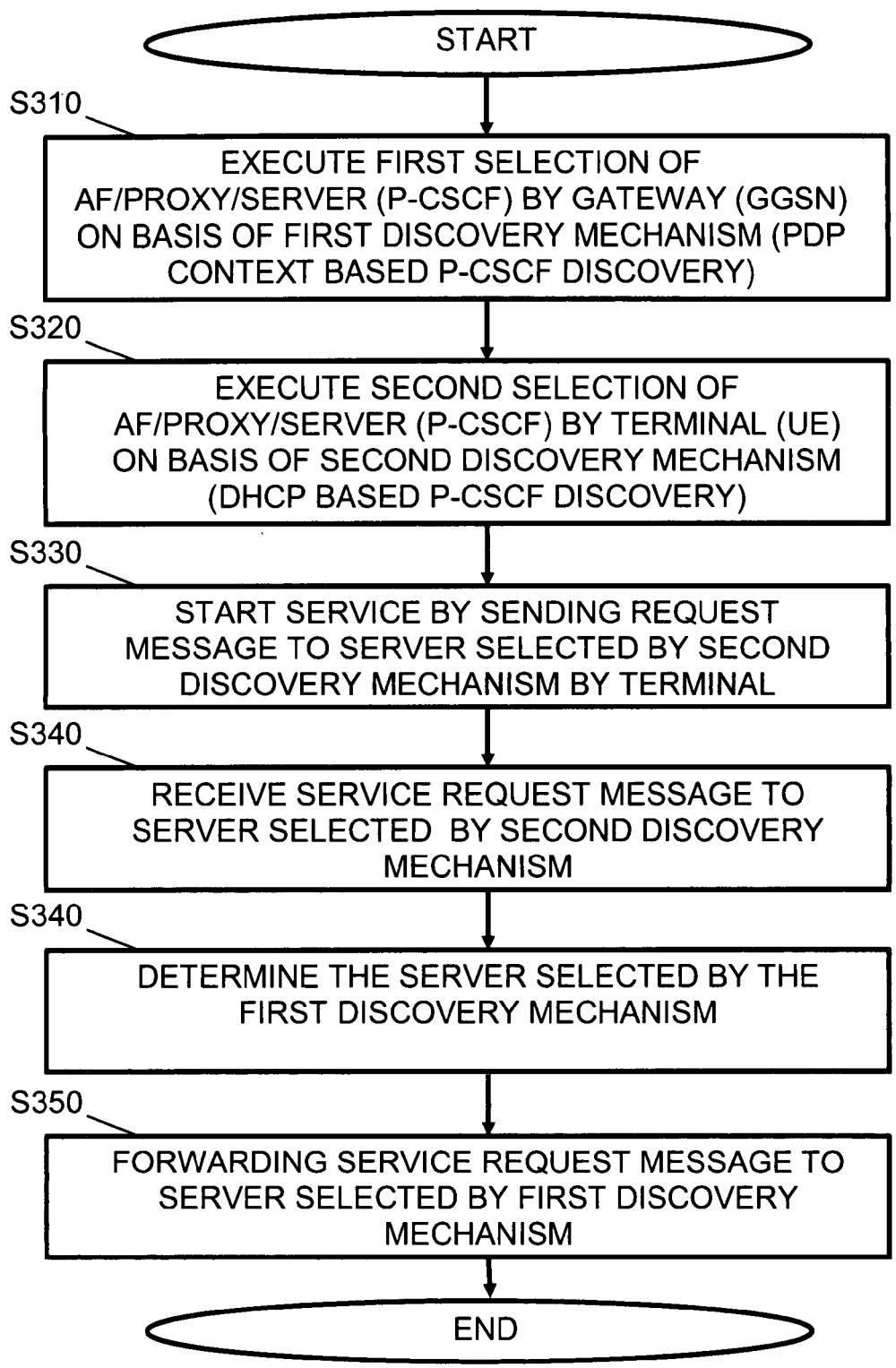
FIG. 10 shows a flow chart illustrating a P-CSCF selection according to the first alternative example.

In FIG. 10, a flow chart illustrating a server/proxy selection according to this example shown in FIG. 8 is described. In step S310, the network control element, such as the gateway network element executes a first discovery mechanism for selecting a proxy server, such as a PDP context based P-CSCF discovery mechanism, and selects a specific P-CSCF (corresponding to step 2 of FIG. 8, P-CSCF2). The details of a PDP context based P-CSCF discovery mechanism are known to those skilled in the art and thus not described in detail here.

Then, in step S320, a selection of a proxy/server based on a second type of discovery mechanism being different to that used by the gateway network element is executed by the terminal equipment (UE). The terminal equipment may using, for example, the DHCP based P-CSCF discovery mechanism described above. The details of a PDP context based P-CSCF discovery mechanism are known to those skilled in the art and thus not described in detail here. Basically, the terminal sends a request to the network in order to contact a DHCP server and obtains address information of candidate P-CSCFs for selection.

In step S330, the terminal equipment has selected a corresponding P-CSCF (e.g. P-CSCF1) which is different from that selected by the gateway network node. For starting a service, the terminal device sends a corresponding service request message to the server selected by it (i.e. the P-CSCF1), which is received by the P-CSCF1 in step S340.

The P-CSCF1 having the similar logic to the network control element regarding the selection of a server determines in step S350 that the network (e.g. the GGSN) has selected another server (i.e. P-CSCF2) and obtains, for example, the address of the P-CSCF2. Now, the P-CSCF1 forwards the service request message received from the terminal equipment to the P-CSCF2, e.g. by sending a Register message to the P-CSCF2.

As a further modification, the policy control element, such as the PCRF, could return the address of the subscriber/subscription/device specific correct P-CSCF at the same time as a response to the enquiry.

According to a second alternative example, the logical name of user's primary/secondary P-CSCF is updated via OTA. For example, the Open Mobile Alliance (OMA) has specified a corresponding mechanism. The provisioning solution, which consists on OMA Device Management (OMA DM) and OMA Client Provisioning (OMA CP) can be enhanced to use the same algorithm like that used in the PDP context (or GPRS) based P-CSCF discovery mechanism. The selection is based preferably on static information and is applicable for terminals using the static P-CSCF information.

According to a third alternative example, the Domain Name Service (DNS) is configured to provide different IP addresses for the logical name according to user's MSISDN.

According to a fourth alternative example, the terminal (UE) delivers an information element whether it supports a specific type to server/proxy discovery, such as the DHCP based P-CSCF discovery, or not, for example in the form of a flag information, to the access network. This may be done, for example, via the Iu (consequently via Gn/Gp) interface. When the access network receives the information element that the terminal uses the DHCP based P-CSCF discovery, for example, it selects a default PCRF (or in case the PCRF is collocated in a P-CSCF, a default P-CSCF). The default PCRF is connected to the default P-CSCF, which is pre-configured also to DHCP server.

Furthermore, in the following, additional alternative examples are described by means of which it is not only possible to ensure that all kind of terminal types send, for example, the SIP registration message to the very same server/proxy, such as the P-CSCF the network, such as GPRS has chosen earlier, but also to use corresponding mechanisms in order to enable that the interface between the (access independent) gateway network element and the policy control element, such as a Gx interface between the access independent network control element and the policy control element, and policy decision functions are working for broadband accesses as well. It is to be noted that there are required changes in a general GGSN in order to become access independent gateway network element.

According to a fifth alternative example, in order to support terminals using fixed or broadband access network or terminals, which are making an attach, such as a GPRS attach, without a SIM (Subscriber Identity Module) card, the P-CSCF discovery mechanisms are based on the IP address and not the MSISDN of a CPE (Customer Premises Equipment).

Now, a sixth alternative example is described. The GPRS network may and will allocate both public and private IP addresses. The IMS and access network can be owned and operated by the same or separated operators. Furthermore currently the IMS is considered to be in private IP address network (to being in public IP address network has been considered to be a security risk).

A Network Address Translator (NAT) traversal is needed, for example, if the private IP address is allocated for a subscriber, if a SIP request is routed onwards to the public IP address network (NAT traversal is done in the boarder of the destination IMS network), or if the controlling IMS network is not in the same private IP address network than packet core. The latter one case is involved (practically always when/) if the request comes from a broadband access network. Because of need for NAT traversal is depending on the access technology of the network, IP address deployment in both home network and in the destination network, business relationship of the operators and pure lack, whether there are still public IP addresses left to allocate in GGSN, there is no way to set the pre-configuration rule whether NAT traversal shall be needed or not.

It is to be noted that the configuration server, such as the DHCP server, which provides the P-CSCF address for GPRS network is different to a server (e.g. also a DHCP server) which allocates the P-CSCF addresses for broadband access. Because of this, the operator may direct the users from broadband access to use the P-CSCF or a certain server having the broadband access capabilities (i.e. NAT control capabilities). This server or P-CSCF does not need to have a relationship with a policy control element to which the access network has connected.

Figure 9:
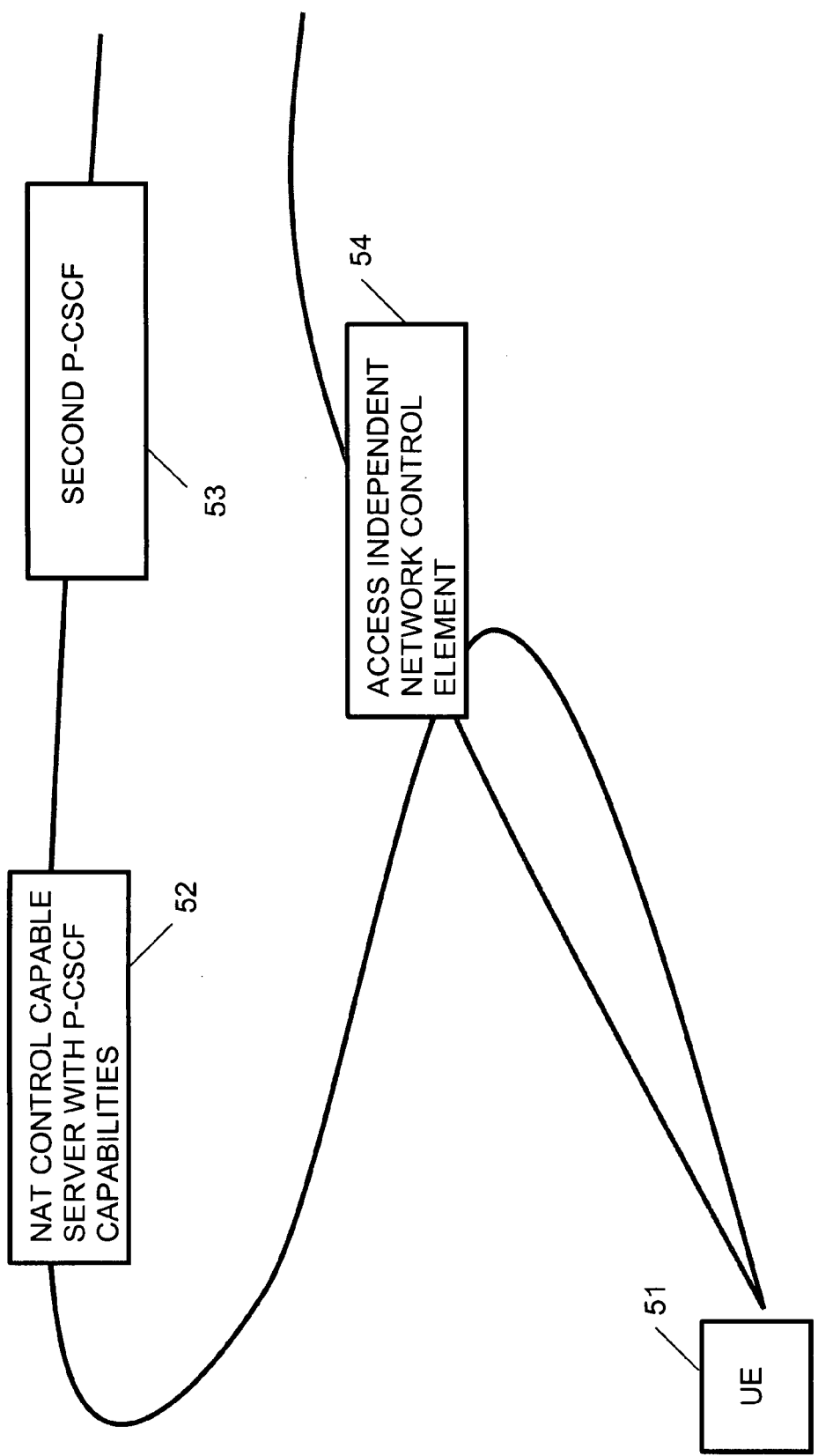
FIG. 9 shows a diagram illustrating a broadband access support mechanism.

In order to provide the policy and charging control for the requests from a broadband access, the NAT control capable server with P-CSCF capabilities is able to re-route the request to the second, policy control capable P-CSCF, which has the policy control interface towards the broadband access network (which may be, for example, TISPAN specified interfaces or 3GPP specified interfaces, such as Gx interface, to the access independent network control element). This is shown in FIG. 9 where reference sign 51 denotes the terminal or user equipment, reference sign 52 denoted the NAT control capable server with P-CSCF capabilities, reference sign 53 denotes the second P-CSCF and reference sign 54 denotes the access independent network control element. The connection lines between elements 51, 52 and 52 describes a control plane signalling connection and the connection line between elements 51 and 54 describes a user plane signalling connection, respectively, by means of which the re-routing is executed. The redirection processing is similar to that described earlier in the first alternative example. The second, policy control capable P-CSCF 53 is the same P-CSCF which the access independent network control element (such as GGSN) 54 has chosen for the request. Because some terminal equipments, such as fixed phones and laptops, do not have a SIM card or the like, and additionally since a xDSL network is not able to carry MSISDN information either, the GGSN is not able to receive such information. Therefore it can not select the second P-CSCF (and policy control element relating to it) according to MSISDN information. As one option to solve this, there may be provided a default branch in the P-CSCF selection table. Alternatively, so-called dummy MSISDNs may have their own rows in table. By means of this, it is possible to lead the selection to result for certain specific policy control element (which has a relation to the certain policy control capable P-CSCF element, i.e. to the second P-CSCF 53) to serve requests from broadband accesses. With these steps and configurations (dummy MSISDN information leading to the specific policy control element (relating to the certain second P-CSCF 53), and a corresponding interface, such as the Gx interface between the policy control element (PCRF) and the PCEF located in the access independent network control element 54, the policy decision functions are applicable for broadband accesses.

Next, further alternative examples are described in which a P-CSCF discovery with an IMS system environment for all session made in broadband access networks as well as emergency calls/sessions made without SIM card in GPRS network are enabled. Furthermore, a possibility to provide location information for an emergency session is described.

Generally, as described above, in case the terminal equipment or UE selects a different P-CSCF than the GPRS network (i.e. the GGSN) has chosen, the consequence is that only SIP registration can be successfully executed while no SIP session is possible (although non-IMS services are available). As similarly described in connection with FIG. 9, if a policy control element, such as a PCRF, tries to find the existing process for a CPE (or the IP address of it), but fails since the GGSN has established the relationship with another policy control element (P-CSCF) during the primary PDP context activation procedure, the PCRF has to reject the SIP session request and all the following requests as well. In the following alternative examples, solutions are described which are applicable also to fixed or broadband access networks which do not carry MSISDN information and the terminals used with these accesses are not having a SIM card. In this connection it is also to be considered that there it is usually possible to make an emergency call even without a SIM card. If there is no SIM card, there is no information about subscriber's MSISDN, so that the situation may arise where the GPRS network can not select the P-CSCF according to it.

According to a seventh alternative example, during a primary PDP context activation/IMS registration procedure, in order to support terminals using fixed or broadband access networks or terminals which are making an attach (for example a GPRS attach) without a SIM card, similar to the fifth alternative example described above, the P-CSCF discovery is based on the CPE's IP address (not MSISDN). This logic effects on the GPRS (PDP context) based P-CSCF discovery procedure, for example, i.e. the GPRS based P-CSCF discovery is supported. In detail, in case the primary PDP context activation request does not comprise MSISDN information, the discovery mechanism uses a CPE's IP address based algorithm.

In case of an emergency session set-up/secondary PDP context activation procedure, according to an eighth alternative example, a session activation request is provided with an emergency call indication (for example, in SIP/payload). When an emergency session is recognized, on the basis of the emergency call indication, for example, the media authorization does not reject the request call. Furthermore, it is set that no charging is needed. The policy control element, such as the PCRF, still gets the information of the SIP session request.

The secondary PDP context activation requests may contain (optional) emergency call indication information. In order to fasten-up the bearer set-up for emergency calls, the network control element, such as a GGSN, skips sending of a media authorization request.

In detail, when a SIP session request reaches the policy control element, like PCRF, the policy control element checks whether the request-URI contains a specific destination identification of a PSAP (public safety answering point), such as an emergency centre number (in a TEL-URI format), or a logical name of the PSAP or another specific indication to identify the PSAP.

The P-CSCF comprises a logic to check whether an emergency call request is concerned. This can be done, for example, by checking whether the request carries the specified emergency indication (in the SIP/payload), or by checking the request-URI content by a special kind of digit or URI analysis to determine whether it matches with preconfigured URIs of emergency centres. It is to be noted that the logic is not limited to these examples but also other mechanisms are usable.

When an emergency session is determined, the media authorization does not reject the request call. Furthermore, it is decided that no charging is needed.

As indicated above, the secondary PDP context activation requests may contain (optional) emergency call indication information. In order to fasten-up the bearer set-up for emergency calls, the network control element, such as a GGSN, skips sending of a media authorization request. This means that the emergency call information detected in IMS has the precedence. If the secondary PDP context activation request does not carry this indication, but the policy control (in P-CSCF) knows that the emergency call is involved it accepts the bearer request without any further QoS or admission control.

On the other hand, in case the bearer request carries the emergency call indication, but the SIP request does not carry any emergency call indication and the request has not considered as an emergency call in IMS, the normal admission, QoS and charging control is taken into use.

According to this eighth alternative example, the relationship and connection between the IMS (P-CSCF or special E-CSCF) and the access network element are configured such that the location information (carried via e.g. own specific interface or via Rq or Gx interface (i.e. Diameter interfaces, so the same Location Information AVP can applied for all interfaces)) can be transmitted and received. This correlation can be indicated by IP address. Note, it is required that there is no NAT traversal between these network elements.

The mechanism described in the seventh and eighth alternative examples are applicable to all types of accesses. Furthermore, the GGSN and the IMS are bound in a one-to-one relation in order to do the subscriber's location information request. Moreover, since another network element applies the location information, this can be considered as trusted information (UE originating location information is considered as un-trusted).

It is to be noted that even though the invention is specified by means of a mechanism which can be applied for a 3GPP rel-7 reference architecture, it is to be noted that the functions and mechanisms described herein are not restricted to the 3GPP architecture. The invention is applicable in its principles also to other network architectures specified by different standardization bodies in which the access network element or policy control element will select the proxy/server, such as a P-CSCF, according to pre-configured information or terminal/subscriber or subscription specific information.

For example, the invention is also applicable to a TISPAN architecture or TISPAN specified policy control model where a so-called PULL-mechanism, which is an access network resource mechanism in the network and in which the access network shall select the policy control element as well, is also applicable.

According to the present invention, there is provided a mechanism to ensure that the same server/proxy is selected by different server/proxy discovery mechanisms executed in a network control element and a terminal equipment, respectively. A first selection of a server/proxy is executed by a network control element on the basis of a first discovery procedure. Then, a second selection of a server/proxy is started by a terminal equipment on the basis of a second discovery procedure. A relay agent element is used for responding to the request on behalf of a configuration server or for modifying a configuration server response so that the same server/proxy is selected by the network control element and the terminal equipment.

It should be understood that the above description and accompanying figures are merely intended to illustrate the present invention by way of example only. The preferred embodiments of the present invention may thus vary within the scope of the attached claims.

The invention claimed is:

1. A method comprising
executing, by a gateway network element, a first selection of a server on the basis of a first discovery procedure to determine address information of the server, the first discovery procedure selecting the server according to a first selection mechanism, wherein the first discovery procedure comprises a packet data protocol context based proxy call state control function (P-CSCF) discovery mechanism;
receiving, at the gateway network element, an address information request message from a terminal equipment, the address information request requesting selection of the server on the basis of a second discovery procedure, the second discovery procedure selecting the server according to a second selection mechanism, wherein the second selection mechanism comprises a dynamic host configuration protocol based P-CSCF discovery mechanism, different from the first selection mechanism, wherein the second selection mechanism modifies address information of the server using a same algorithm as the first discovery procedure, wherein the modified address information of the server comprises a same server address as the address information determined by the first discovery procedure; and
responding to the address information request message by causing transmission, by the gateway network element, of the modified address information of the server selected in the first selection by the first discovery procedure.

2. The method according to claim 1, wherein the gateway network element comprises a relay agent element.

3. The method according to claim 1, wherein the first discovery procedure is a packet data protocol context based discovery mechanism.

4. The method according to claim 1, wherein the server to be selected comprises at least one of an application function server and a proxy server.

5. The method according to claim 4, wherein the application function server comprises a Proxy Call State Control Function.

6. The method according to claim 1, further comprising providing at least one policy control element.

7. The method according to claim 6, further comprising allocating only one policy control element to the server.

8. The method according to claim 6, further comprising allocating a plurality of policy control elements to the server,
executing a predetermined load balancing mechanism for selecting a same one of the plurality of policy control elements.

9. The method according to claim 8, further comprising executing the predetermined load balancing mechanism in the server and in a network gateway element.

10. An apparatus comprising at least one processor and at least one memory storing computer program code, wherein the at least one memory and stored computer program code are configured, with the at least one processor, to cause the apparatus to at least:
perform a selection of a server on the basis of a first discovery procedure to determine address information of the server, the first discovery procedure selecting the server according to a first selection mechanism, wherein the first discovery procedure comprises a packet data protocol context based proxy call state control function (P-CSCF) discovery mechanism;
receive an address information request message from a terminal equipment, the address information request requesting selection of the server on the basis of a second discovery procedure, the second discovery procedure selecting the server according to a second selection mechanism, wherein the second selection mechanism comprises a dynamic host configuration protocol based P-CSCF discovery mechanism, different from the first selection mechanism, wherein the second selection mechanism modifies address information of the server using a same algorithm as the first discovery procedure, wherein the modified address information determined by the second discovery procedure comprises a same server address as the address information determined by the first discovery procedure;
process the address information request message, and
respond to the address information request message by causing transmission of the modified address information of the server selected in the first selection by the first discovery procedure.

11. The apparatus according to claim 10, wherein the first discovery procedure is a packet data protocol context based discovery mechanism.

12. The apparatus according to claim 10, wherein the server to be selected comprises at least one of an application function server or a proxy server.

13. The apparatus according to claim 12, wherein the application function server comprises a Proxy Call State Control Function.

14. The apparatus according to claim 10, wherein the at least one memory and stored computer program code are configured, with the at least one processor, to further cause the apparatus to execute functions of a relay agent element.

15. The apparatus according to claim 10, wherein the at least one memory and stored computer program code are configured, with the at least one processor, to further cause the apparatus to execute a predetermined load balancing mechanism for selecting one of a plurality of policy control elements, wherein the same predetermined load balancing mechanism is executed by the server.

16. A computer program product for a computer, comprising a non-transitory memory storing software code portions for causing, when said software code portions are run on the computer, said computer to:
execute a first selection of a server on the basis of a first discovery procedure to determine address information of the server, the first discovery procedure selecting the server according to a first selection mechanism, wherein the first discovery procedure comprises a packet data protocol context based proxy call state control function (P-CSCF) discovery mechanism;

receive an address information request message from a terminal equipment, the address information request requesting selection of the server on the basis of a second discovery procedure, the second discovery procedure selecting the server according to a second selection mechanism, wherein the second selection mechanism comprises a dynamic host configuration protocol based P-CSCF discovery mechanism, different from the first selection mechanism, wherein the second selection mechanism modifies address information of the server using a same algorithm as the first discovery procedure, wherein the modified address information determined by the second discovery procedure comprises a same server address as the address information determined by the first discovery procedure;

process the address information request message; and respond to the address information request message by causing transmission of the modified address information of the server selected in the first selection by the first discovery procedure.

17. A method comprising executing, at a first node, a first selection of a server on the basis of a first discovery procedure to determine address information of the server, the first discovery procedure selecting the server according to a first selection mechanism, wherein the first discovery procedure comprises a packet data protocol context based proxy call state control function (P-CSCF) discovery mechanism;

receiving, at the first node, an address information request message from a terminal equipment, the address information request requesting selection of the server on the basis of a second discovery procedure, the second discovery procedure selecting the server according to a second selection mechanism, wherein the second selection mechanism comprises a dynamic host configuration protocol based P-CSCF discovery mechanism, different from the first selection mechanism, wherein the second selection mechanism modifies address information of the server using a same algorithm as the first discovery procedure, wherein the modified address information determined by the second discovery procedure comprises a same server address as the address information determined by the first discovery procedure;

causing information included in the address information request message to be forwarded from the first node to a configuration server connected to a communication network;

receiving, at the first node, in response from the configuration server address information;

processing, at the first node, the received address information on the basis of the first discovery procedure; and responding to the address information request message by causing transmission, by the first node, of the modified address information derived from the processing of the received address information, wherein the second discovery procedure is a dynamic host configuration protocol based discovery mechanism.

18. The method according to claim 17, wherein the first node comprises a relay agent element.

19. The method according to claim 18, wherein the relay agent element is comprised in a gateway network element.

20. The method according to claim 17, wherein the first discovery procedure is a packet data protocol context based discovery mechanism.

21. The method according to claim 17, wherein the server to be selected comprises a Proxy Call State Control Function.

22. The method according to claim 17, further comprising providing at least one policy control element.

23. The method according to claim 17, further comprising executing a predetermined load balancing mechanism in the server and in a network gateway element.

24. An apparatus comprising at least one processor and at least one memory storing computer program code, wherein the at least one memory and stored computer program code are configured, with the at least one processor, to cause the apparatus to at least:

perform a selection of a server on the basis of a first discovery procedure to determine address information of the server, the first discovery procedure selecting the server according to a first selection mechanism, wherein the first discovery procedure comprises a packet data protocol context based proxy call state control function (P-CSCF) discovery mechanism;

receive an address information request message from a terminal equipment, the address information request requesting selection of the server on the basis of a second discovery procedure, the second discovery procedure selecting the server according to a second selection mechanism different from the first selection mechanism and wherein the second discovery procedure is a dynamic host configuration protocol based discovery mechanism, wherein the second selection mechanism modifies address information of the server using a same algorithm as the first discovery procedure, wherein the modified address information determined by the second discovery procedure comprises a same server address as the address information determined by the first discovery procedure;

cause information included in the address information request message to be forwarded to a configuration server connected to a communication network;

process the address information received in response from the configuration server on the basis of the first discovery procedure; and respond to the request message by causing transmission of the modified address information derived from the processing of the received address information.

25. The apparatus according to claim 24, wherein the first discovery procedure is a packet data protocol context based discovery mechanism.

26. The apparatus according to claim 24, wherein the server comprises a Proxy Call State Control Function.

27. The apparatus according to claim 24, wherein the at least one memory and stored computer program code are configured, with the at least one processor, to further cause the apparatus to execute functions of a dynamic host configuration protocol relay agent.

28. The apparatus according to claim 24, wherein the apparatus is a gateway network element.

29. The apparatus according to claim 24, wherein the at least one memory and stored computer program code are configured, with the at least one processor, to further cause the apparatus to communicate with at least one policy control element.

30. The apparatus according to claim 29, herein the at least one memory and stored computer program code are configured, with the at least one processor, to further cause the apparatus to execute a predetermined load balancing mechanism for selecting one of a plurality of policy control elements, wherein the same predetermined load balancing mechanism is executed by the server.

31. A computer program product for a computer, comprising a non-transitory memory storing software code portions for causing, when said software code portions are run on the computer, said computer to:

execute a first selection of a server on the basis of a first discovery procedure to determine address information of the server, the first discovery procedure selecting the server according to a first selection mechanism, wherein the first discovery procedure comprises a packet data protocol context based proxy call state control function discovery mechanism;

receive an address information request message from a terminal equipment, the address information request requesting selection of the server on the basis of a second discovery procedure, the second discovery procedure selecting the server according to a second selection mechanism different from the first selection mechanism and wherein the second discovery procedure is a dynamic host configuration protocol based discovery mechanism, wherein the second selection mechanism modifies address information of the server using a same algorithm as the first discovery procedure, wherein the modified address information determined by the second discovery procedure comprises a same server address as the address information determined by the first discovery procedure;

cause information included in the address information request message to be forwarded to a configuration server connected to a communication network;

receive in response from the configuration server address information;

process the received address information on the basis of the first discovery procedure; and respond to the address information request message by causing transmission of the modified address information derived from the processing of the received address information.

32. An apparatus comprising means for performing a selection of a server on the basis of a first discovery procedure to determine address information of the server, the first discovery procedure selecting the server according to a first selection mechanism, wherein the first discovery procedure comprises a packet data protocol context based proxy call state control function discovery mechanism;

means for receiving an address information request message from a terminal equipment, the address information request requesting selection of the server on the basis of a second discovery procedure, the second discovery procedure selecting the server according to a second selection mechanism different from the first selection mechanism and wherein the second discovery procedure is a dynamic host configuration protocol based discovery mechanism, wherein the second selection mechanism modifies address information of the server using a same algorithm as the first discovery procedure, wherein the modified address information determined by the second discovery procedure comprises a same server address as the address information determined by the first discovery procedure;

means for processing the address information request message; and means for responding to the address information request message by causing transmission of the modified address information of the server selected in the first selection on the basis of the first discovery procedure.

33. A system comprising at least a first and a second server, a network control element executing a first selection of the first server on the basis of a first discovery procedure to determine address information of the server, the first discovery procedure selecting the server according to a first selection mechanism, wherein the first discovery procedure comprises a packet data protocol context based proxy call state control function discovery mechanism; and a terminal equipment executing a second selection of the second server on the basis of a second discovery procedure, the second discovery procedure selecting the server according to a second selection mechanism different from the first selection mechanism and wherein the second discovery procedure is a dynamic host configuration protocol based discovery mechanism, wherein the second selection mechanism modifies address information of the second server using a same algorithm as the first discovery procedure, wherein the modified address information of the second server comprises a same server address as the address information determined by the first discovery procedure; and, wherein the second server is configured:

to receive an address information request message from the terminal equipment, the address information request message being performed according to the second discovery procedure;

to determine the first server selected by the network control element; and to forward a service request message to the first server on the basis of the request message received from the terminal equipment.

* * * * *